US007434501B2

(12) United States Patent
Chuang

(10) Patent No.: US 7,434,501 B2

(45) Date of Patent: Oct. 14, 2008

(54) QUICKLY COLLAPSIBLE PROTECTIVE COVER UNIT FOR A TABLE SAWING MACHINE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 82 days.

(21) Appl. No.: 11/509,825

(22) Filed: Aug. 25, 2006

(65) Prior Publication Data

US 2008/0047409 A1 Feb. 28, 2008

(51) Int. Cl.

| | |
|---|---|
| ***B23D 19/00*** | (2006.01) |
| ***B23D 45/00*** | (2006.01) |
| ***B27B 3/28*** | (2006.01) |
| ***B27B 5/06*** | (2006.01) |
| ***B26D 5/08*** | (2006.01) |
| ***B27G 19/00*** | (2006.01) |

(52) U.S. Cl. .......................... 83/478; 83/102.1; 83/544; 144/251.1

(58) Field of Classification Search ................ 83/102.1, 83/477.2, 478, 544, 520, 110, 581; 144/255.1, 144/286.1, 286.5, 287, 253.1, 251.1, 253.3, 144/251.3

See application file for complete search history.

(56) References Cited

U.S. PATENT DOCUMENTS

| | | | | |
|---|---|---|---|---|
| 1,791,335 | A * | 2/1931 | Wallisch et al. | 144/253.1 |
| 5,447,085 | A * | 9/1995 | Gochnauer | 83/102.1 |
| 6,578,460 | B2 * | 6/2003 | Sartori | 83/100 |
| 7,210,386 | B1 * | 5/2007 | Chang | 83/477.2 |
| 7,302,878 | B2 * | 12/2007 | Chang | 83/102.1 |
| 2001/0035081 | A1 * | 11/2001 | Sutton | 83/102.1 |
| 2004/0255745 | A1 * | 12/2004 | Peot et al. | 83/102.1 |
| 2007/0095185 | A1 * | 5/2007 | Chang | 83/478 |
| 2007/0113715 | A1 * | 5/2007 | Burke et al. | 83/102.1 |
| 2007/0186739 | A1 * | 8/2007 | Peot et al. | 83/102.1 |

* cited by examiner

*Primary Examiner*—Ghassem Alie
*Assistant Examiner*—Bharat C Patel
(74) *Attorney, Agent, or Firm*—Ming Chow; Sinorica, LLC

(57) ABSTRACT

A quickly collapsible protective cover unit for a table sawing machine includes two protective covers, two connecting rods, an elongate base and a dividing plate. The dividing plate has its upper end combined between two lengthwise sides of one end portion of the base, provided with plural slots for a fitting rod of plural fixing blocks located at one end portion of the base to fit therein. The slots respectively have a stop edge for retaining the fitting rod therein, not to loosen out of the slots when the fitting rods are pushed in the slots. Then the compress bolt and the fitting rods can tightly force the base and the dividing plate combined with each other. So the protective cover unit can be assembled or collapsed quickly, without using any tool, by handling the compress bolt.

4 Claims, 6 Drawing Sheets

QUICKLY COLLAPSIBLE PROTECTIVE COVER UNIT FOR A TABLE SAWING MACHINE

BACKGROUND OF THE INVENTION

1. Field of the Invention

This invention relates to a table sawing machine, particularly to one provided with a quickly collapsible cover unit for a table sawing machine.

2. Description of the Prior Art

A table sawing machine generally provided with a protective device for preventing a user from getting wounded or hurt by a circular saw, and it is a protective cover unit positioned around the circular saw of the table sawing machine. FIG. 1 shows a conventional protective cover unit 10, which includes an extension rod 11, a dividing plate 12 and a protective cover 13 orderly combined together, with a bolt 14 tightly holding the parts together.

However, when the protective cover unit 10 is to be collapsed, it takes a lot of time with a special tool required, causing not a small inconvenience.

SUMMARY OF THE INVENTION

This invention has been devised to offer a quickly collapsible protective cover unit for a table sawing machine.

The feature of the invention is two protective covers, two connecting rods, an elongate base and a dividing plate. The two protective covers are combined with two lengthwise sides of the base, and the dividing plate has its upper end combined between two lengthwise sides of an outer end of the base, provided with plural slots each consisting of a vertical slot and a horizontal slot extending inward from the lower end of the vertical slot, and a stop edge formed at a connecting point of the vertical and the horizontal slot. Further a compress bolt screws down through the outer end of the base to compress plural fixing blocks to let plural fitting rods of the fixing blocks to fit in the slots of the dividing plate so that the dividing plate may be tightly combined with the base, without using any tool. Then reversely, the protective cover unit can quickly be collapsed from the dividing plate by releasing the compress bolt, without requiring any tool.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
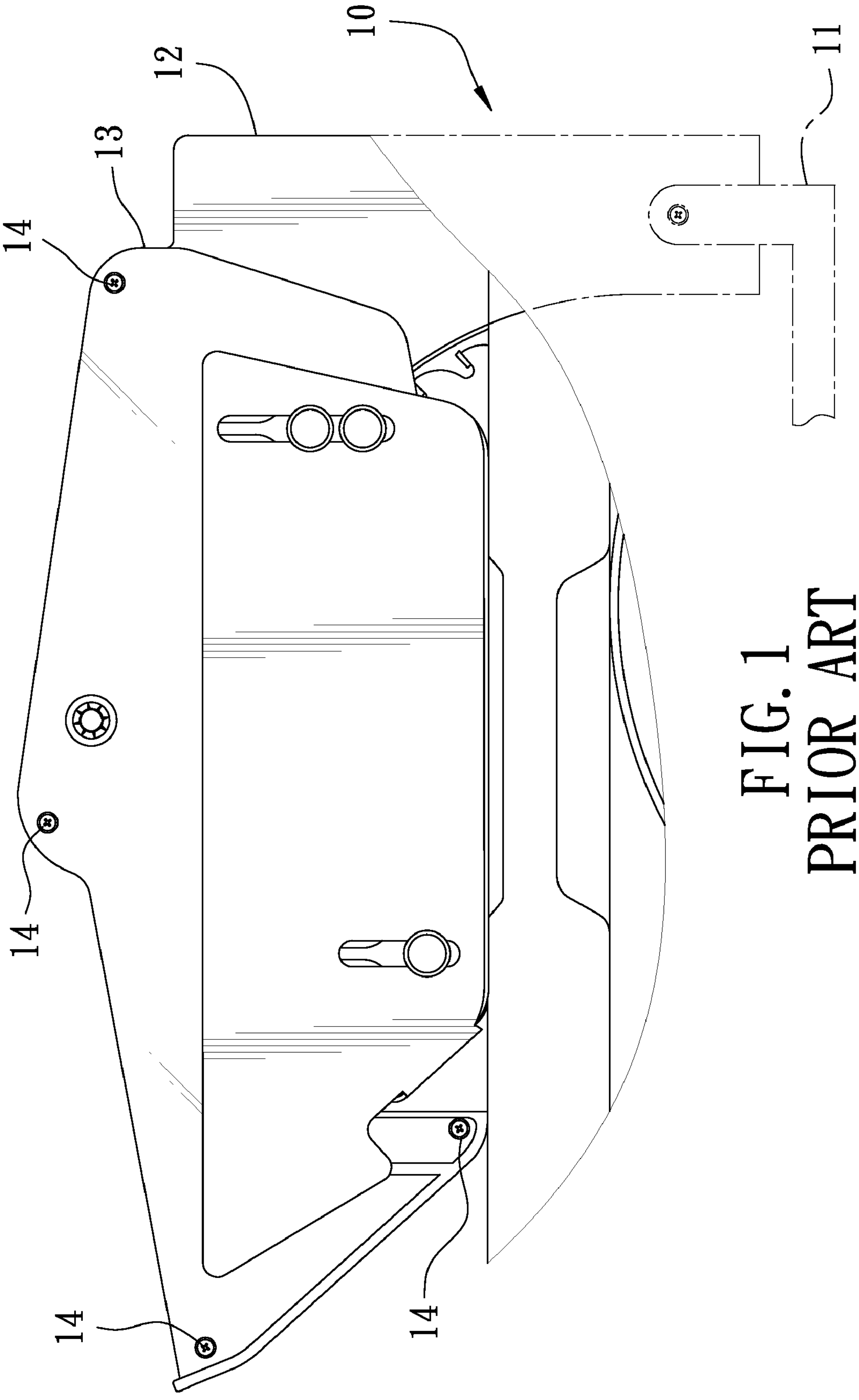
FIG. 1 PRIOR ART
FIG. 1 is a partial side view of a protective cover unit of a conventional table sawing machine.
Figure 2:
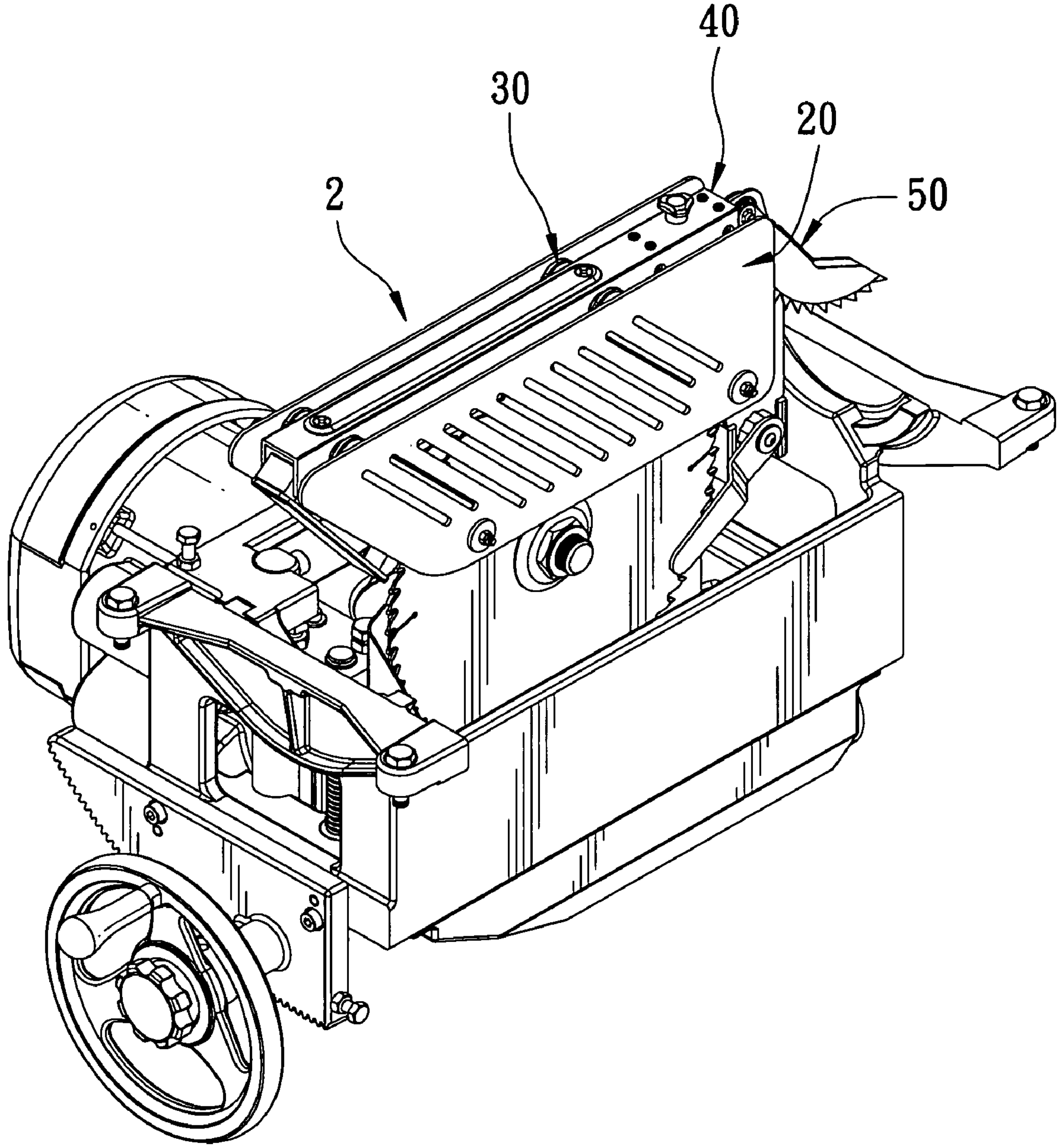
FIG. 2 is a perspective view of a quickly collapsible protective cover unit for a table sawing machine in the present invention.
Figure 3:
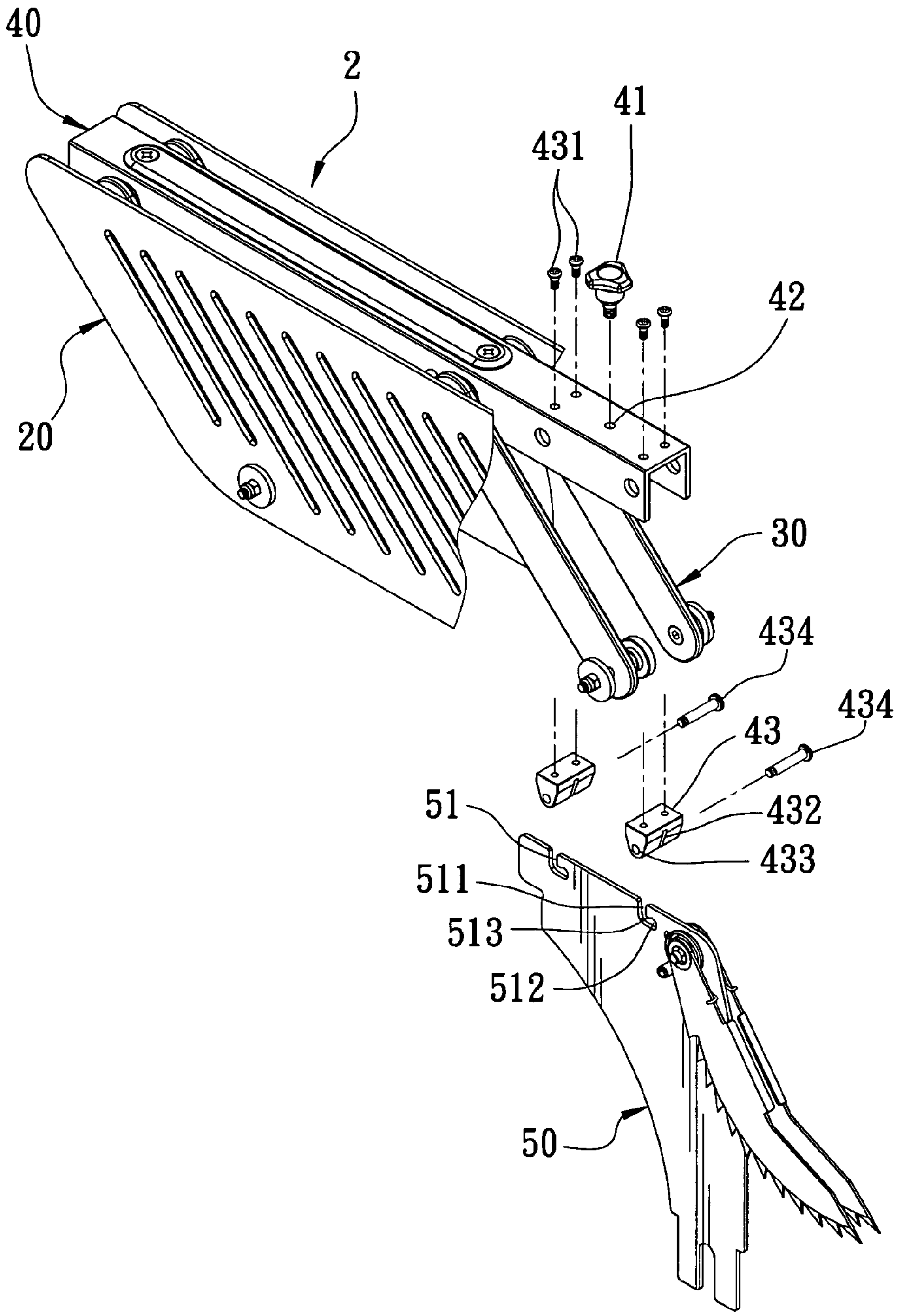
FIG. 3 is an explode perspective view of the quickly collapsible protective cover unit for a table sawing machine in the present invention.
Figure 4:
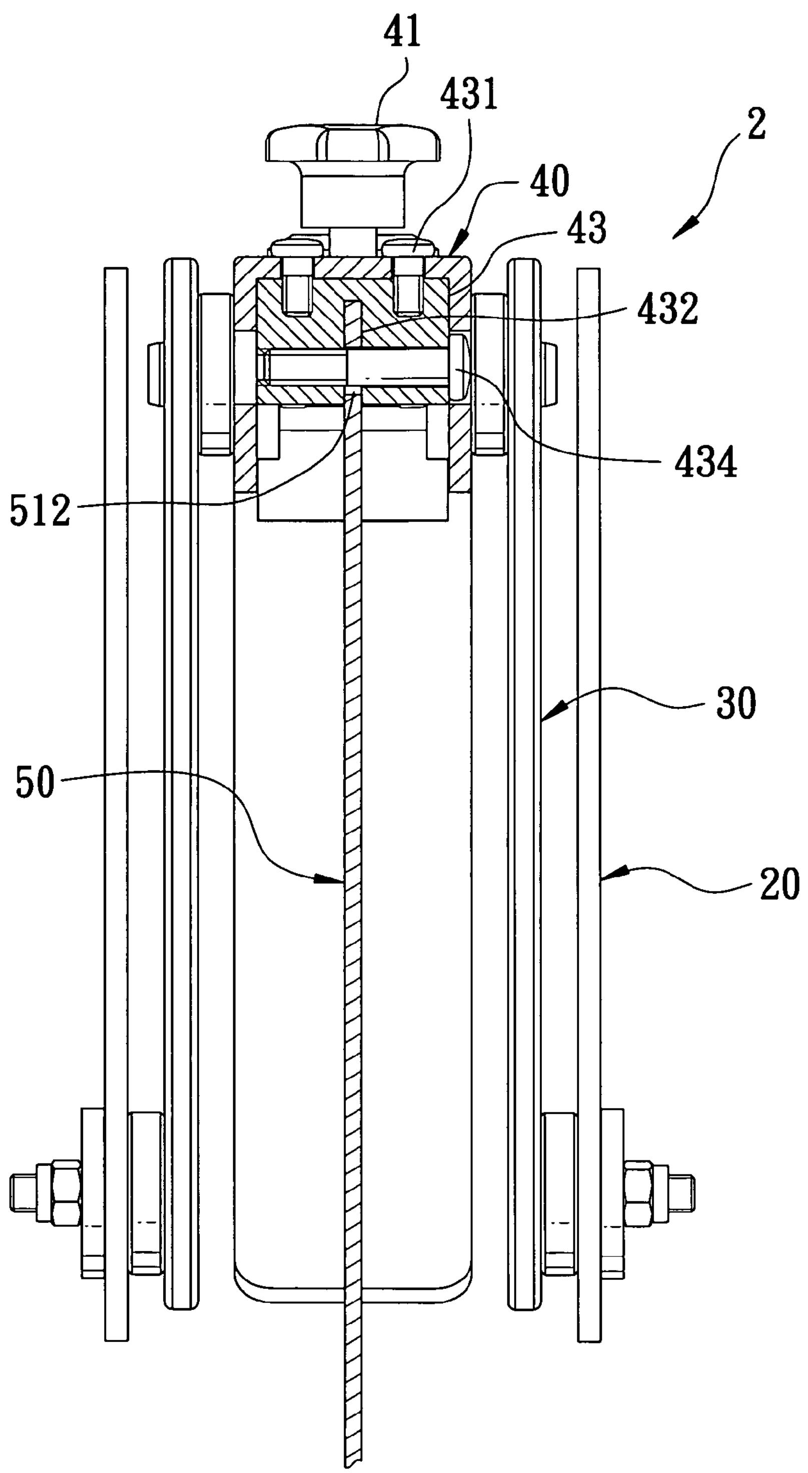
FIG. 4 is a cross sectional view of the quickly collapsible protective cover unit for a table sawing machine in the present invention.

A preferred embodiment of a quickly collapsible protective cover unit 2 for a table sawing machine in the present invention, as shown in FIGS. 2, 3 and 4, includes two protective covers 20, two connecting rods 30, an elongate base 40 and a dividing plate 50. The combining way is generally the same as those of the conventional one, not to be detailed.

The two protective covers 20 are positioned at two lengthwise sides of the base, having their lower end threadably connected to the lower end of the two connecting rods 30, hiding about an upper half portion of the two sides of the circular saw.

The two connecting rods 30 have their lower end threadably connected to the two protective covers 20 and their upper end fixed with the two sides of the elongate base 40.

The elongate base 40 is pivotally connected at a preset location in an outer end with a compress bolt 41, which screws with a threaded hole 42 bored in the outer end portion of the elongate base 40. Two fixing blocks 43 are provided to position spaced apart in the interior of the outer end of the elongate base 40, and held tightly by bolts 431 with the elongate base 40. Each fixing block 43 is provided with a vertical fitting groove 432 in a intermediate portion of one side, and a through hole 433 lengthwise in a lower portion for a fitting rod 434 to extend therein and exposing out a little.

The dividing plate 50 has its upper end portion combined in the interior of the outer end portion of the elongate base 40, and two L-shaped slots 51 spaced apart in the upper end. Each L-shaped slot 51 is composed of a vertical slot 511 and a horizontal slot 512 extending flatly inward from the lower end of the vertical slot 511. The two L-shaped slots 51 correspond respectively to the two fixing blocks 43, with the fitting rod 434 of the fixing blocks 43 possible to fit in or get there out. Further, a stop edge 513 is formed at the connecting point of the vertical slot 511 and the horizontal slot 512 for restricting the fitting rod 434 in the L-shaped slot 51, not let the same rod 434 to loosen there out, after the fitting rods 434 are forced in the two L-shaped slots 51. The width of the fitting groove 432 of each fixing block 43 is a little larger than the thickness of the dividing plate 50 so that the dividing plate 50 may fit in the fitting grooves 432 of the two fixing blocks 43, with the fitting rods 434 caught in the L-shaped slots 51 at the same time.

Figure 5:
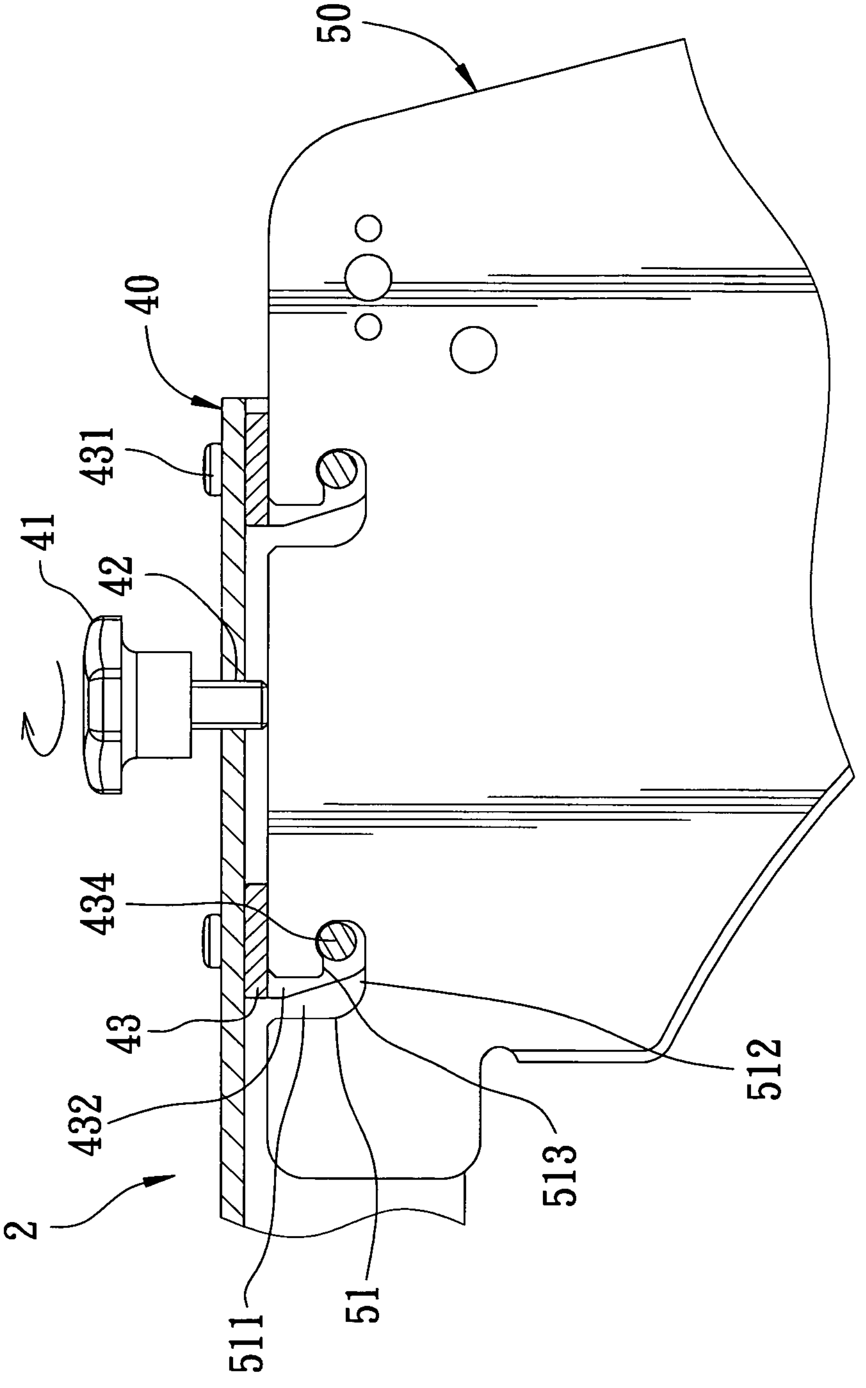
FIG. 5 is a side cross-sectional view of the base of the protective cover unit combined with a dividing plate in the present invention; and, FIG. 6 is a side cross-sectional view of the base separated quickly from the dividing plate in the present invention.

In assembling the protecting cover unit 2, as shown in FIG. 5, firstly the fitting rods 434 of the two fixing blocks 43 are aligned to the upper end of the vertical slots 511 of the L-shaped slots 51, and then are pushed to reach the lower end of the vertical slots 511. Subsequently, the fixing blocks 43 are then pushed to let the fitting rods 434 move in the horizontal slots 512. Then the compress bolt 41 is screwed inward in the threaded hole 42, shoving the upper end of the dividing plate 50, with the fitting rods 434 a little pushed upward so that the elongate base 40 is tightly combined with the dividing plate 50. At the same time, the stop edges 513 of the slots 51 of the dividing plate 50 can completely retain the fitting rods 434, impossible let the same rods 434 to loosen out of the L-shaped slots 51. So a user can quickly combine the protecting cover unit 2, without any tool.

Figure 6:
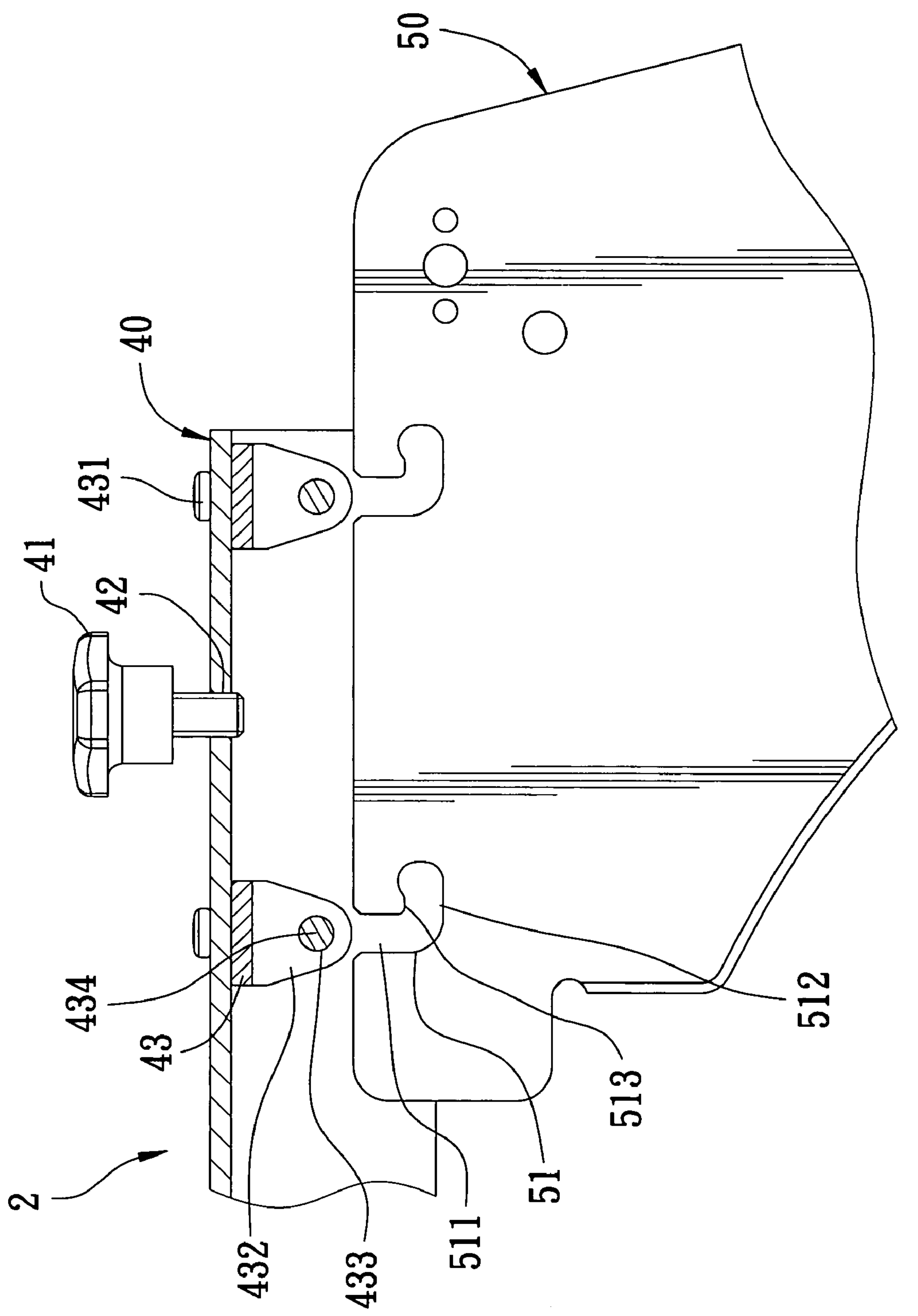

On the contrary, if the protective cover unit 2 is to be collapsed, firstly loosen the compress bolt 41, release the stop edges 513 from the fitting rods 434, and then move forward the elongate base 40 to let the fitting rods 434 move to the lower end of the vertical slots 511. Then push up the elongate base 40 to let the fitting rods 434 get out completely of the L-shaped slots 51, as shown in FIG. 6, without any tool required. Thus the protective cover unit 2 can be quickly collapsed with convenience.

This invention has the advantage that the protective cover unit can swiftly be collapsed by releasing the compress bolt 41 to separate the fitting rods 434 from the L-shaped slots 51 of the dividing plate 50, and reversely combine the fitting rods

434 in the L-shaped slots 51 by screwing tightly the compress bolt 41 against the dividing plate 50, without using any tool, very convenient to handle.

While the preferred embodiment of the invention has been described above, it will be recognized and understood that various modifications may be made therein and the appended claims are intended to cover all such modifications that may fall within the spirit and scope of the invention.

What is claimed is:

1. A quickly collapsible protective covers unit for a table sawing machine, said unit comprising:

two protective covers located at two sides of an elongate base and threadably connected to a lower end of two connecting rods;

said two connecting rods respectively having its upper end fixed to a preset location of two sides of said elongate base;

said elongate base having its outer end portion pivotally connected with a compress bolt, which screws through down a threaded hole bored in said outer end portion of said elongate base;

said compress bolt screwing to tightly push said elongate base against a dividing plate, two fixing blocks located respectively spaced apart in front of and behind said compress bolt and fixed in an interior of said elongate base by screws, each said fixing block further provided with a vertical groove bored in an intermediate portion of one side, a fitting rod extending in a lengthwise hole bored in a lower portion of each said fixing block; and a dividing plate located under said outer end portion of said elongate base, said dividing plate provided with plural slots spaced apart in a front section of an upper end portion, said plural slots respectively consisting of a vertical slot and a horizontal slot extending inward from a lower end of said vertical slot, said slots facing to said two vertical grooves of said two fixing blocks so that said fitting rods of said two fixing blocks extending through and out of said lengthwise hole of said fixing blocks fit in said slots, a stop edge formed at a connecting point of said vertical slot and said horizontal slot for restricting said fitting rods in said slots.

2. The quickly collapsible protective cover unit for a table sawing machine as claimed in claim 1, wherein said plural slots are in quantity of two.

3. The quickly collapsible protective cover unit for a table sawing machine as claimed in claim 1, wherein said plural slots are of L-shape.

4. The quickly collapsible protective cover unit for of a table sawing machine as claimed in claim 1, wherein said compress bolt is a screw.

* * * * *